United States Patent [19]

Lloyd

[11] Patent Number: 5,007,187
[45] Date of Patent: Apr. 16, 1991

[54] SNOW PLOW ARRANGEMENT FOR MOISTURE RETENTION IN A FIELD

[76] Inventor: Mervin R. J. Lloyd, Box 55, D'Arcy, Saskatchewan, Canada, S0L 0N0

[21] Appl. No.: 390,236

[22] Filed: Aug. 7, 1989

[51] Int. Cl.$^5$ .............................................. E01H 4/00
[52] U.S. Cl. ...................................... 37/220; 37/269; 172/176; 172/708; 172/709
[58] Field of Search ................. 37/219, 220, 269, 272; 172/176, 202, 701, 708, 709

[56] References Cited

U.S. PATENT DOCUMENTS

| | | | |
|---|---|---|---|
| 1,418,173 | 5/1922 | Reynolds | 172/708 |
| 2,501,557 | 3/1950 | Wikkerink | 172/709 X |
| 3,915,239 | 10/1975 | Hendrichon | 37/219 X |
| 4,173,261 | 11/1979 | Wells | 172/202 X |

FOREIGN PATENT DOCUMENTS

| | | | |
|---|---|---|---|
| 27229 | 6/1887 | Canada . | |
| 1091441 | 12/1980 | Canada . | |
| 1222303 | 10/1965 | Fed. Rep. of Germany | 172/709 |
| 22702 | 8/1948 | Finland | 37/269 |
| 431832 | 4/1975 | U.S.S.R. | 37/219 |
| 793429 | 1/1981 | U.S.S.R. | 37/269 |

*Primary Examiner*—Randolph A. Reese
*Assistant Examiner*—Arlen L. Olsen
*Attorney, Agent, or Firm*—Adrian D. Battison; Stanley G. Ade; Murray E. Thrift

[57] ABSTRACT

A snow plow member is attached to selected ones of the shanks of a cultivator frame by inserting the leading edges of the sweep at the lower end of the shank into slots formed on the rear surface of the snow plow member. A leading edge of the snow plow member follows the C-shaped curvature of the shank. The shank is clamped to the underside of the snow plow member. With such snow plow members attached to selected ones of the cultivator shanks, the snow plow members can be used to form furrows in the snow which acts to trap additional snow and to prevent the snow from being stripped from the field. The resultant increased accumulations of snow provide additional moisture retention for the field.

11 Claims, 2 Drawing Sheets

SNOW PLOW ARRANGEMENT FOR MOISTURE RETENTION IN A FIELD

BACKGROUND OF THE INVENTION

This invention relates to a method and apparatus for improving moisture retention in a field and particularly for capturing additional quantities of snow during the winter season.

Up until now little attention has been given to the collection of snow since its importance in total moisture content of the soil during the growing season has been little appreciated. Furthermore recently, particularly in view of drought conditions or low moisture conditions in the prairies, more attention has been given to the collection of snow as an effective technique for improving soil moisture conditions at the early stages of the growing season.

Proposals have previously been made for leaving stubble in the field as an improved technique for trapping snow.

In the absence of some technique for trapping the snow, snow tends merely to blow across the surface of the soil during windy conditions so that the snow which has fallen is stripped from the ground and deposited at other areas around obstacles such as trees from where the moisture is merely lost as run-off when melting occurs.

When the snow is left in its initial flat fallen condition, the movement of snow particles acts as a grinding mechanism for stripping away yet further particles so that in many cases the field can be left fully bare despite a nominal snow fall of a significant depth.

Up until now nothing has been available to prevent the snow erosion and little or no attention has been given to this problem.

It is of course well known that various forms of snow plow devices have previously been used for pushing aside snow for example as shown in Canadian Patent No. 27,229 which can be attached to the front of a rail vehicle to push the snow to either side of the tracks.

In addition various forms of landscrapers, blades and cultivators have been provided which act upon the ground to provide a levelling action or to provide cultivation of the ground surface. However these devices are not relevant to the problem in hand that is that of improving the retention of a snow covering on the field to improve moisture retention.

SUMMARY OF THE INVENTION

It is one object of the present invention, therefore, to provide an improved method and apparatus for use in improving snow retention and thus total moisture retention in a field.

According to the first aspect of the invention there is provided a method of improving moisture retention in a field comprising forming a plurality of parallel furrows in snow in the field.

According to the second aspect of the invention there is provided an apparatus for improving moisture retention in the field comprising a frame, means for transporting the frame across the ground in a working direction, and a plurality of snow plow members each mounted on the frame and spaced in relation transversely to the working direction, each being shaped to form a furrow in snow on the ground and each being spaced and arranged such that the furrow formed by one is spaced from the furrow formed by the next.

According to a third aspect of the invention there is provided a snow plow member for attachment to a cultivator shank for use in improving moisture retention in the field, the cultivator shank being of the type having a generally C-shaped curved shank portion, an upper end for attachment to a tool bar and a cultivator sweep attached to a lower end, the sweep having a forwardmost apex and a pair of leading edges diverging rearwardly and outwardly from the apex, the snowplow member comprising an apex, a leading edge extending from the apex upwardly, a pair of surfaces diverging rearwardly and outwardly from the leading edge and defining at a lowermost edges of the surfaces a pair of side leading edges diverging outwardly and rearwardly from the apex, means defining a pair of slots lying in a horizontal plane and each facing rearwardly of the respective one of the side leading edges for receiving a respective one of the leading edges of the sweep, and clamping means for clamping the member to the shank.

The snow plow member can thus be used after a significant snow fall to move the snow into ridges, the tops of which can be nearly double the nominal depth of the snow cover. If subsequently further snow fall or drifting occurs the moving snow particles can be trapped in between the ridges, that is in the valleys, with the possibility of significantly increasing the amount of moisture retained.

The use of the snow plow member which is attached to the cultivator shank enables the cultivator frame to act as the transport system for the snow plow members. The construction of the snow plow members as defined above allows the snow plow member to be attached to one of the cultivator shanks without the necessity of removing the cultivator sweep so that the snow plow members can be readily attached to and removed from the cultivator. In this way the farmer can modify existing equipment by purchasing a number of relatively simple elements to carry out the moisture retention enhancement with little further investment.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
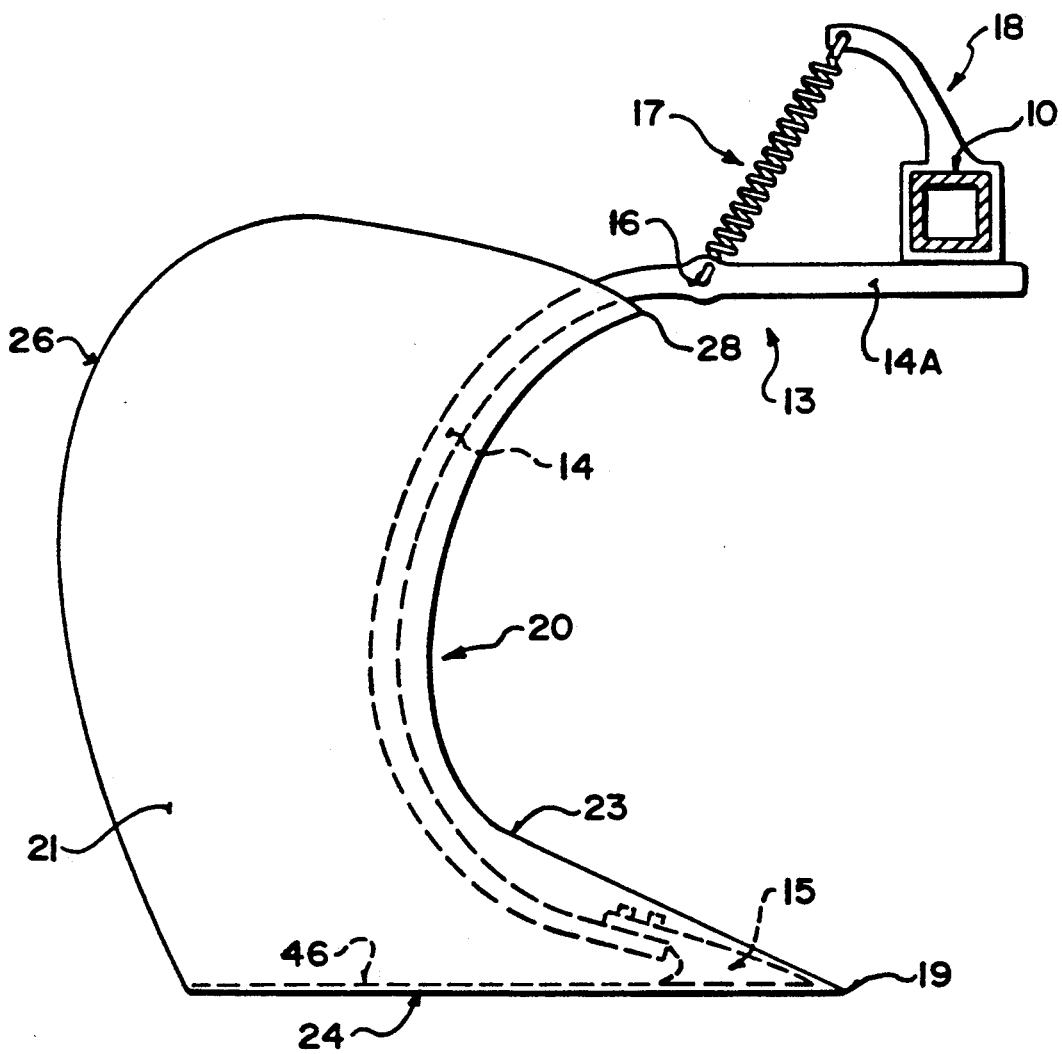
FIG. 1 is side elevational view of a cultivator shank incorporating a snow plow member for use in the present invention.
Figure 2:
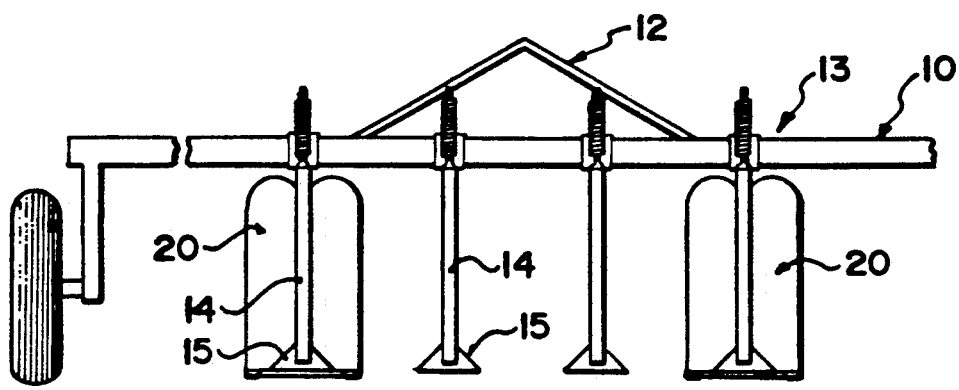
FIG. 2 is a rear elevational view showing schematically a cultivator including the shank and snow plow member of FIG. 1.

A conventional cultivator frame is shown in FIGS. 1 and 2 and comprises a tool bar 10 which is mounted on ground wheels one of which is schematically indicated at 11 for transportation across the ground in a working direction. A hitch 12 is schematically indicated for attachment to a suitable tractor vehicle.

Attached to the tool bar 10 is a plurality of cultivator shanks generally indicated at 13 each comprising a shank 14 and a sweep 15. The shank is generally C-shaped including a straight upper portion 14A for attachment to the tool bar and a lower portion to which the sweep 15 is attached. An opening 16 is provided just rearwardly of the upper forward portion attached to the tool bar for receiving the spring mounting 17 of a trip mechanism generally indicated at 18.

The tool bar 10 carries a plurality of such conventional cultivator shanks and generally there is provided a plurality of further tool bars parallel to the first on which further cultivator shanks are mounted so that the shanks overlap in their operation.

The above construction is entirely conventional and features of the present invention relate to the novel use of the cultivator frame together with a construction of the snow plow arrangement attached thereto. One of the snow plow devices is indicated at 20 and is shown in detail in FIGS. 1, 3, and 4. As shown in FIG. 2, the snow plow members 20 are mounted on selected ones of the cultivator shanks so they are spaced apart across the frame leaving spaces between the snow plow members which are wider than the snow plows themselves.

Each snow plow member comprises a pair of surfaces 21 and 22 which are welded together along a leading edge 23. The leading edge commences at an apex 19 at the lowermost portion and extends in a straight line upwardly and rearwardly from the apex and then a curved C-shape which generally follows the curvature of the shank so the leading edge can be positioned just forwardly of the shank. Thus the C-shape of the leading edge extends upwardly and rearwardly in a curved line from the apex to a rearmost point on the curve and from that point curves forwardly and upwardly to an uppermost point forward of the rearmost point. The two surfaces 21 and 22 diverge from the leading edge along two leading side edges 24 and 25 which lie in a horizontal plane at a base of the snow plow member. Two trailing edges 26 and 27 of the sides 21 and 22 are curved in a shape somewhat similar to the C-shape of the front leading edge and extend from a rearmost point of each of the side leading edges 24, 25 up to an upper apex 28 at the uppermost point on the leading edge 23.

Figure 3:
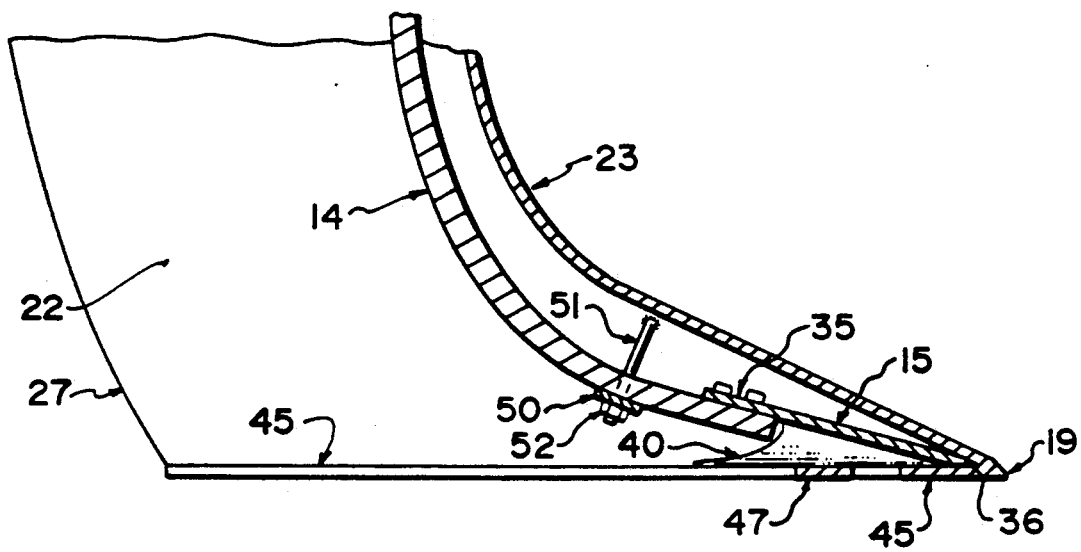
FIG. 3 is a cross sectional view of the shank and, snow plow member of FIG. 1.
Figure 4:
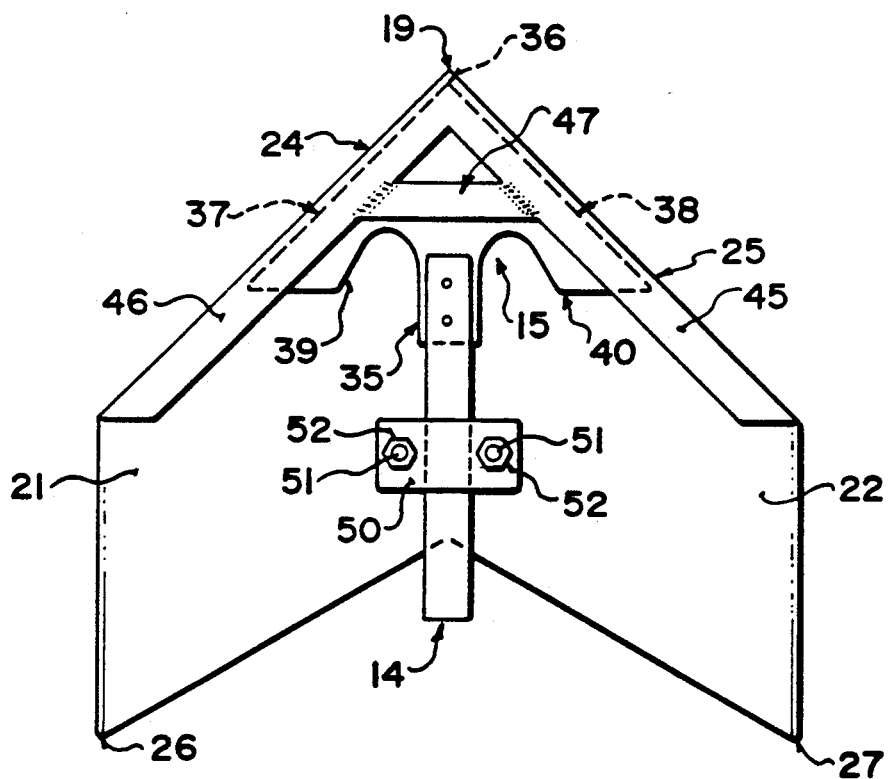
FIG. 4 an underside view of the shank and snow plow member of FIG. 1.

As best shown in FIGS. 3 and 4, the sweep includes a plate 35 which bolts to the upper surface of the shank 14 at lowermost end thereof. The plate inclines downwardly to a front apex 36 of the sweep and side edges of the sweep lie in a horizontal plane including the apex. The side edges are indicated at 37 and 38. Trailing edges 39 and 40 of the sweep extend from the horizontal plane at the rear part of the sweep up to the upper plate 35. The sharp leading edges of the sweep therefore lie in a horizontal plane.

The snow plow member includes a pair of flat plates 45 and 46 which are welded to the edges of the surfaces 21 and 22. The flat plates 45 and 46 together with the surfaces therefore form a slot which faces rearwardly from the side leading edges of the snow plow member. These slots are shaped so as to receive the leading edges of the sweep which can be pressed into the slot as best shown in FIG. 3. A cross brace 47 is welded across the space between the plates 45 and 46. The snow plow member can therefore be applied to the shank simply by slipping the snow plow member in a rearward direction over the sweep so that it is held in place by resting upon the sweep with the leading edge arranged just in front of the shank and the side surfaces contacting the front corners of the shank and extending outwardly and rearwardly therefrom. The cross brace allows the device to be mounted on a worn shovel. The plates 45 and 46 extend to the rear edge of the surfaces 21 and 22 to provide extra rigidity. In order to maintain the device clamped in position, an additional clamping element is provided in the form of a plate 50 which has a pair of holes for placing over bolts 51 welded to the underside of the surfaces so as to project on either side of the shank. The plate is then clamped into position by nuts 52. In this way the snow plow member is held rigidly in place on the shank simply by the cooperation between the slots on the leading edges of the sweep and the clamping action of the plate around the shank. Other types of clamping arrangement can be used.

With the device firmly located in place, the cultivator frame can be moved across the ground with the height of the tool bar adjusted so that the sweeps graze the ground but do not cause any cultivating action. At this height the snow plow members engage any snow resting upon the ground and lift it away from the leading edge to form furrows in the snow with the removed snow being lifted onto the areas between the furrows.

This formation of furrows has two effects. Firstly, it provides grooves for trapping further snow fall or drifting snow which would otherwise tend to blow across the upper surface of the snow. Secondly, movement of the snow tends to cause a packing action which prevents the snow particles from being stripped and driven across the surface of the snow to grind away yet further snow particles.

In practice the snow plow member might have a width of the order of 30 to 36 inches and a spacing of one snow plow member from the next being of the order of six feet.

In an alternative arrangement (not shown) the snow plow members are shaped for bolting to a cultivator shank with the shovel (sweep) removed. This arrangement provides an effective mount for the snow plow member which allows flexing and tripping where necessary. In one arrangement, a frame may be provided which allows lateral adjustment of the positions of the snow plow members to provide different spacings to accommodate different snow conditions.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for improving moisture retention in the field comprising a frame, means for transporting the frame across the ground in a working direction, and a plurality of snow plow members each mounted on the frame and spaced in relation transverse to the working direction, each being shaped to form a furrow in snow on the ground and each being spaced and arranged such that the furrow formed by one is spaced from the furrow formed by the next, each of the snow plow members having a leading edge with a lowermost and forwardmost apex on a bottom end thereof and a pair of diverging side surfaces extending from the leading edge to trailing edges thereof and wherein the distance between one snow plow member and the next snow plow member is greater than the width of each of the snow plow members across said trailing edges thereof, each of the diverging side surfaces having a lowermost leading edge lying in a substantially horizontal plane containing the apex, the leading edge being C-shaped so as to extend in a curved line rearwardly and upwardly from the apex to a rearmost point and from the rearmost point in a curved line forwardly and upwardly to an uppermost point forward of the rearmost point.

2. The invention according to claim 1 wherein the frame has a plurality of ground wheels for supporting the frame in movement across the ground and a hitch assembly for attachment to a tractor vehicle.

3. The invention according to claim 1 wherein the frame is a cultivator frame with a plurality of cultivator shanks mounted thereon and extending therefrom downwardly toward the ground, each snow plow member including means thereon for fastening thereof to a respective one of said cultivator shanks.

4. The invention according to claim 3 wherein each of the cultivator shanks has a sweep mounted thereon shaped to define a forwardmost apex and a pair of leading edges diverging rearwardly and outwardly from the apex, the snow plow member having means thereon defining a pair of slots each for receiving the respective on of the leading edges of the sweep.

5. The invention according to claim 4 wherein said mean defining said pair of slots lies in a horizontal plane and faces rearwardly of the snow plow member.

6. The invention according to claim 4 including clamping means for clamping the member to the shank.

7. The invention according to claim 1 including clamping means having a pair of bolts each extending rearwardly from a position on respective one of the diverging side surfaces so that the bolts project rearwardly from the shank with one on each side of the shank, a plate, and a pair of nuts clamping the plate against a rear surface of the shank.

8. A snow plow member for attachment to a cultivator shank for use in improving moisture retention in the field, the cultivator shank being of the type having a generally C-shaped curved shank portion, an upper end for attachment to a tool bar and a cultivator sweep attached to a lower end, the sweep having a forwardmost apex and a pair of leading edges diverging rearwardly and outwardly from the apex, the snowplow member comprising an apex, a leading edge extending from the apex upwardly, a pair of surfaces diverging rearwardly and outwardly from the leading edge and defining at lowermost edges of the surfaces a pair of side leading edges diverging outwardly and rearwardly from the apex, means defining a pair of slots lying in a horizontal plane and each facing rearwardly of the respective one of the side leading edges for receiving a respective one of the leading edges of the sweep, and clamping means for clamping the member to the shank.

9. The invention according to claim 8 wherein the leading edge is substantially C-shaped so as to follow the line of the shank at a position just forwardly of the shank.

10. The invention according to claim 8 including clamping means having a pair of bolts each extending rearwardly from a position on respective one of the side surfaces so that the bolts project rearwardly from the shank with one on each side of the shank, a plate, and a pair of nuts clamping the plate against a rear surface of the shank.

11. A snow plow member for attachment to a cultivator shank for use in improving moisture retention in the field, the cultivator shank being of the type having a generally C-shaped curved shank portion, an upper end for attachment to a tool bar and means for mounting a cultivator sweep at a lower end, the snow plow member comprising an apex, a substantially C-shaped leading edge extending from the apex upwardly so as to follow the line of the shank at a position just forwardly of the shank, a pair of surfaces diverging rearwardly and outwardly from the leading edge and defining at lowermost edges of the surfaces a pair of side leading edges diverging outwardly and rearwardly from the apex, and fastening means for fastening the member to the shank.

* * * * *